United States Patent Office 3,153,029
Patented Oct. 13, 1964

3,153,029
TERMINAL MODIFIED POLYMERIC MATERIALS
William J. Tabar, South Charleston, and Richard A. Walther, St. Albans, W. Va., assignors to Union Carbide Corporation, a corporation of New York
No Drawing. Filed Apr. 12, 1961, Ser. No. 102,403
7 Claims. (Cl. 260—94.9)

This invention relates to the production of modified polymers having improved physical properties. More particularly, this invention relates to the reaction of a high molecular weight solid polymer with a terminating agent to produce modified polymeric materials having improved physical properties.

The modified polymers of the instant invention are characterized by one or more improved physical properties over those of the unmodified polymeric materials from which they are obtained. Thus, when the modified polymeric materials of the instant invention are fabricated, for example, by extrusion or blow molding or other techniques, into shaped articles, the crack resistance and environmental stress rupture properties of such articles are far superior to the same properties of articles fabricated from the unmodified polymeric materials. This is indeed surprising because the terminal modified polymers of the instant invention have lower molecular weights, as indicated by higher melt indexes, than the unmodified materials from which they are obtained, a factor which heretofore had been believed to be detrimental to the environmental crack resistance of an article.

Furthermore, films cast from the modified polymers and copolymers of the instant invention have a lower haze, better gloss, and contain fewer "fisheyes," than films cast from unmodified polymers and copolymers. In addition to having a better appearance, the films produced from the modified polymers and copolymers are characterized by improved impact strength, puncture resistance, and tear strength. The improved appearance and properties of films formed from the modified polymers and copolymers of the instant invention make them eminently suitable for use as packaging materials.

It has been discovered, in accordance with the instant invention, that homopolymers of ethylene and copolymers thereof with at least one other polymerizable monomer containing the $CH_2=C<$ radical, for example, the copolymers of an alpha olefin with vinyl acetate, divinyl ether, acrylic acid, ethyl acrylate, bicyclo[2.2.1]-2-heptene, etc.; or with carbon monoxide can be modified to produce polymeric materials having the improved physical properties enumerated by thermally treating such polymers under autogenous pressure in the presence of a terminating agent. The copolymers mainly of interest are those containing a polymerized vinyl ester, vinyl alkyl ethers, vinyl ether, acrylic acid or ester derivative thereof. However, other copolymers as defined above are also suitable. By a "terminating agent" is meant a chemical capable of combining with the free radical formed during the reaction to stabilize it against further reaction. Such terminating agents are preferably resonant-stabilized hydrocarbons which are capable of uniting with the free radicals produced by the thermal treatment of the polymers employed in the process of the instant invention, but are themselves incapable of undergoing further reaction. These agents thus serve to prevent the free radicals from propagating by terminating the free radical chain.

In this manner, molecules of lower molecular weight having a combined molecule of the "terminating agent" in the terminal position of the polymer chain are produced. Among the preferred terminating agents are styrene, isopropenyl acetate, carbon monoxide, alpha monoolefins, allyl chloride, and other resonant-stabilized compounds of the type

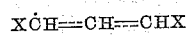

in which X is an organic radical, and the like.

The terminating agent enters the polymer chain at its end. This has been established by infrared analysis. Thus, for example, when styrene is the terminating agent used the modified polymers have the formula

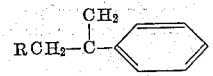

in which R is the polymer chain. That this form is present has been established by infrared analysis.

For the sake of convenience, the invention will be discussed mainly in terms of the modification of polyethylene in the presence of styrene; however, it should be understood that the invention is equally applicable to the modification of all the polymers described above with all the terminating agents herein disclosed. Illustrative of the suitable polymers which can be used as starting materials, or base materials, in this invention, one can mention polyethylene, polypropylene, poly(butene-1), poly(3-methylpentene-1), poly(decene-1), ethylene/butene-1 copolymers, ethylene/propylene copolymers, ethylene/ethyl acrylate copolymers, ethylene/vinyl acetate copolymers, ethylene/methyl methacrylate copolymers, ethylene/carbon monoxide copolymers, ethylene/divinyl ether copolymers, and the like.

In accordance with one aspect of this invention, polyethylene is heated at an elevated autogenous pressure with styrene at a temperature of from about 250° C. to about 400° C., preferably from about 300° C. to about 375° C., for a period of from about 0.25 minute to about 10 minutes, preferably not more than 5 minutes.

The polyethylene employed in the process of the instant invention can be produced by any of the known processes and can be either of the linear or branched-chain variety, having a molecular weight of at least 10,000 up to about 3,000,000, or more, and a density of from about 0.910 to about 0.960. While the density of the starting polymer will vary depending upon the particular polymer or copolymer employed, polymers having a molecular weight of at least 10,000 are employed if polymers having the improved properties set forth above are to be obtained.

While, theoretically, any amount of styrene can be employed in the process of the instant invention, as a practical matter, the amount should seldom exceed 10 percent by weight of the total initial charge, or some homopolymerization of styrene might occur. In general, an amount of styrene ranging from about 0.25 percent by weight to about 20 percent by weight, preferably from about 1 percent by weight to about 5 percent by weight, based on the weight of the initial charge, is suitable.

The temperature employed in the reaction can vary widely; however, it should not be permitted to exceed the degradation temperature of the polymer, i.e., the temperature at which degradation to the extent that carbonization results or at which the product will be rendered too brittle for conventional applications. A sufficiently elevated temperature should be employed to maintain the reaction mixture in the molten state and to generate free radicals.

When temperatures of from about 250° C. to about 300° C. are employed in the process of the instant invention the overall melt index of the polymer employed is generally unaltered as a sufficient number of free radicals recombine to maintain the molecular weight constant. When temperatures of from about 300° C. to about 375° C. are employed, however, the melt index of the polymer increases due to a greater amount of chain scission. Generally, polymers having a melt index of from about 0.4 to about 1.0 decigram per minute are increased in melt index to from about 3.5 to about 6.5 decigram per minute when processed at temperatures of about 355° C. ±10° C.

When temperatures in excess of 375° C. are employed, for example from about 375° C. to about 400° C., very unusual products can be obtained by the process of the instant invention. Thus, when polyethylene having a density of about 0.917 gram per cc. and a melt index of about 0.36 decigram per minute was processed with styrene at autogenous pressure and a temperature of about 400° C., a modified polymer having a density of about 0.926 gram per cc. and a melt index of about 1200 decigram per minute was obtained which processed outstanding mechanical properties when compared with polyethylene polymerized directly to the same density and melt index. Thus, the modified polymer had a tensile strength of 1950 p.s.i. and a stiffness of 38,000 p.s.i., while polyethylene polymerized to similar density and melt index was so brittle that specimens could not be obtained for such tests. In any instance, however, melt indexes above 1500 decigrams per minute are not desired.

The modified polyethylenes produced in accordance with the instant invention at temperatures in excess of about 375° C. are particularly useful in injection molding of large items where high flow but only moderate toughness are required.

Reaction between the molten polyethylene and styrene should obviously be allowed to continue for the period of time sufficient to produce the modified polymer, as set forth above. Prolonged reaction periods are not recommended since this may result in degradation of the polymer. In general, the reaction time will depend upon the temperature and autogenous pressure employed, with shorter reaction periods being required when higher temperatures and pressures are employed than are required at less elevated temperatures and pressures.

A conventional extruder has been found to be a suitable means for effecting a satisfactory blend of the polymer and the terminating agent prior to introducing the mixture into the reaction zone. Thus, for example, a mixture of polyethylene pellets and liquid styrene is first fluxed in an extruder to form a homogeneous mass, and then pumped into the reaction zone. Reaction, of course, will commence before the molten blend reaches the reaction zone if the temperature and pressure conditions in the extruder are sufficiently elevated. In fact, the reaction may be conducted entirely in the extruder if this be desirable.

Alternatively, styrene, either alone or in solution in a small amount of an inert liquid solvent, can be added to the molten polyethylene as it emerges from the extruder but before it reaches the reaction zone.

Preferably, the reactor is tubular in shape and contains a "torpedo" which provides for an annular flow path between the tube and torpedo, permitting a more accurate temperature control of the molten mixture.

The unreacted styrene is generally stripped from the molten modified polymer which emerges from the reactor. This may be conveniently accomplished, for example, by heating, or by means of a continuous, twin screw mill operated under vacuum, with the heat from the polymer stream providing the latent heat of vaporization of the styrene.

Unless otherwise specified, all parts and percentages, as used throughout this specification, are by weight; and all p.s.i. measurements are expressed in absolute values.

The data obtained showed that high density resins suitable for the production of film having improved clarity and gloss are produced by this invention. Whereas, a resin having the same melt index and high density as obtained by a direct polymerization is not satisfactory, and a resin having the same melt index and high density as obtained by cracking a higher molecular weight polymer is not as satisfactory for the production of film.

The following examples are set forth for purposes of illustration so that those skilled in the art may better understand this invention, and it should be understood that they are not to be construed as limiting this invention in any manner.

EXAMPLE I

A polyethylene resin having a density a density of about 0.916 which had been produced by polymerizing ethylene at a pressure of about 30,000 p.s.i.g. and a temperature of about 195° C. in the presence of air as catalyst was soaked for one hour in styrene containing 0.02 percent by weight of tert-butylcatechol as an inhibitor. The wet blend was screened of excess liquid until it contained 8.4 percent by weight of styrene, and was then fed at the rate of 18 pounds per hour to a 2-inch Hartig extruder which was heated with steam maintained at a temperature of 180° C. The blend was thoroughly fluxed in the extruder before being pumped into a stainless steel reactor consisting of a tube having a 2-inch inside diameter and 30 inches long which contained a stainless steel "torpedo" of 1⅞-inch outside diameter. The temperature of the reaction was 275° C. The rate of flow of the molten blend through the reactor was such that the average contact time within the reactor was approximately one minute. The molten blend which emerged from the tube was passed through a short steam-jacketed transfer line and fed into a twin screw mill operating under a pressure of less than about 1.5 inches Hg absolute within a jacket maintained at a temperature of 250° C. The styrene modified polyethylene recovered by the above procedure contained about 0.23 weight percent of combined styrene, situated in the terminal position in the polymer chain, as indicated by infrared analysis. The resin was evaluated in accordance with conventional testing techniques, and the results obtained were compared with the results obtained from the unmodified polyethylene base material. The results are summarized in Table A below. A film cast from the modified polyethylene had far fewer fisheyes than one case from the unmodified film.

*Table A*

| Property | Control | Modified Polyethylene Prepared at 275° C. |
|---|---|---|
| Melt Index,[1] dg./min | 2.3 | 3.5 |
| Density,[2] g./cc | 0.916 | 0.916 |
| Film Clarity: | | |
|   Haze,[3] percent | 21.0 | 9.8 |
|   Gloss,[4] percent | 54 | 99 |
|   See-through,[5] ft | 1 | 12 |
| Impact Strength of Film,[6] ft.-lbs./in.: | | |
|   Machine direction | 195 | 323 |
|   Transverse direction | 110 | 336 |

[1] ASTM method D-1238-52T.
[2] ASTM method D-1505-57T.
[3] ASTM method D-1003-52. A decrease in haze moduli indicates an improvement.
[4] ASTM method D-523-53T.
[5] Similar to ASTM method D-1003-59T except that the percent transmission is measured at a deviation of ±0.07 degrees rather than ±1.3 degrees. See-through defines how clearly the detail of an object not in contact with the film can be observed through the film.
[6] Similar to ASTM method D-256-47 T except that the test specimen is a "dog bone" comprised of several thicknesses of film which have a minimum dimension of ⅛-inch.

EXAMPLE II

A polyethylene resin prepared by polymerizing ethylene with a catalyst consisting of an aluminum alkyl and titanium tetrachloride in heptone at a temperature of about 70° C. was passed through the system described in Example I at a rate of 12 to 14 pounds per hour. Styrene was pumped through a nozzle into the molten polyethylene at a rate 150 cc./hr. just before the polyethylene was fed into the reactor which was maintained at 365° C. The styrene modified polyethylene recovered by the above procedure was evaluated as in Example I, and the results obtained were compared with the results obtained from the same resin heated in the same manner but in the absence of styrene. The results are summarized in Table B below:

Table B

| Property | Control | Modified Polyethylene Prepared at 365° C. |
|---|---|---|
| Melt Index, dg./min | .4 | 2.8 |
| Flow Ratio (440 p.s.i./44 p.s.i.) | 95 | 55 |
| Density, g./cc | 0.952 | 0.952 |
| Crack Resistance (boiled 30 min.)[1]: | | |
| $F_0$ hours | 0.8 | 1.2 |
| $F_{50}$ hours | 1.3 | 28.0 |

[1] Determined in a manner similar to the well-known procedure employed by the Bell Laboratories.

EXAMPLE III

A polyethylene resin similar to that employed in Example I was blended with four percent by weight of styrene and passed through the system described in Example I at a rate of about 18 pounds per hour. The temperature of the reaction mixture was maintained at 400° C. instead of at 275° C. as in Example I, and the twin screw mill was operated at a temperature of 200° C. instead of 250° C. The styrene modified polyethylene recovered by the above procedure was evaluated as in Example I, and the results obtained were compared with the results obtained from the unmodified base material, and with the results obtained from unmodified polyethylene directly produced by the free-radical, high-pressure polymerization of ethylene to a melt index and density comparable to the modified polyethylene. The results are summarized in Table C below.

Table C

| Property | Control | Modified Polyethylene Prepared at 400° C. | Comparative Polyethylene |
|---|---|---|---|
| Melt Index, dg./min | 0.36 | 1,200 | 1,200. |
| Density, g./cc | 0.917 | 0.926 | 0.926. |
| Tensile Strength [1], p.s.i | 2,260 | 1,950 | |
| Yield Strength [2], p.s.i | 1,360 | 1,950 | Too brittle to measure |
| Elongation [3], percent | 745 | 25 | |
| Stiffness at 1% Elongation [4], p.s.i. | 20,000 | 38,000 | |

[1] ASTM method D-638-52T.
[2] Determined in accordance with D-638-52T by dividing the load at yield by the original cross sectional area of the test specimen.
[3] ASTM method D-638-52T.
[4] ASTM method D-747-58T.

EXAMPLE IV

Twenty-four and one-half (24.5) pounds of a polyethylene resin prepared by polymerizing ethylene with a catalyst consisting of an aluminum alkyl and titanium tetrachloride in heptane at a temperature of about 70° C. was blended with 0.5 pound of isopropenyl acetate and passed through the system described in Example I at a rate of about 16 to about 18 pounds per hour. The temperature of the reaction mixture was maintained at 350° C. instead of at 275° C. as in Example I. The isopropenyl acetate modified polyethylene recovered by the above procedure was evaluated as in Example I, and the results obtained were compared with the results obtained from the same resin heated in the same manner but in the absence of isopropenyl acetate. The results are summarized in Table D below.

Table D

| Property | Control | Modified Polyethylene Prepared at 350° C. |
|---|---|---|
| Melt Index, dg./min | 5.5 | 5.5 |
| Flow Ratio, 440 p.s.i./44 p.s.i | 65 | 52 |
| Density, g./cc | 0.95 | 0.95 |
| Film Clarity: | | |
| Haze, percent | 13.8 | 9.0 |

What is claimed is:

1. A continuous process for producing styrene modified polyethylene which comprises heating polyethylene having a molecular weight of at least 10,000, and a density of from about 0.910 to about 0.960, in the presence of styrene, and in the absence of a polymerization initiator, at a temperature of from about 250° C. to about 4000° C., under autogenous pressure for a period of from about 0.25 minute to about 10 minutes.

2. A continuous process for producing styrene modified polyethylene which comprises heating polyethylene having a molecular weight of at least 10,000, and a density of from about 0.910 to about 0.960, in the presence of styrene, and in the absence of a polymerization initiator, at a temperature of from about 300° C. to about 375° C., under autogenous pressure for a period of from about 0.25 minute to about 10 minutes.

3. A continuous process for producing styrene modified polyethylene which comprises heating polyethylene having a molecular weight of at least 10,000, and a density of from about 0.910 to about 0.960, in the presence of from about 0.25 percent by weight to about 20 percent by weight of styrene, based on the combined weight of the styrene and polyethylene and in the absence of a polymerization initiator, at a temperature of from about 300° C. to about 375° C., under autogenous pressure for a period of from about 0.25 minute to about 10 minutes.

4. A continuous process for producing isopropenyl acetate modified polyethylene which comprises heating polyethylene having a molecular weight of at least 10,000, and a density of from about 0.910 to about 0.960, in the presence of isopropenyl acetate, and in the absence of a polymerization initiator, at a temperature of from about 250° C. to about 400° C., under autogenous pressure for a period of from about 0.25 minute to about 10 minutes.

5. A continuous process for producing isopropenyl acetate modified polyethylene which comprises heating polyethylene having a molecular weight of at least 10,000 and a density of from about 0.910 to about 0.960, in the presence of from about 0.25 percent by weight to about 20 percent by weight of isopropenyl acetate, based on the combined weight of the isopropenyl acetate and polyethylene and in the absence of a polymerization initiator, at a temperature of from about 300° C. to about 375° C., under autogenous pressure for a period of from about 0.25 minute to about 10 minutes.

6. A styrene modified polyethylene produced by heating polyethylene having a molecular weight of at least 10,000, and a density of from about 0.910 to about 0.960, in a continuous process in the presence of styrene, and in the absence of a polymerization initiator, at a temperature of from about 250° C. to about 400° C., under autogenous pressure for a period of from about 0.25 minute to about 10 minutes.

7. An isopropenyl acetate modified polyethylene produced by heating polyethylene having a molecular weight of at least 10,000, and a density of from about 0.910 to about 0.960, in a continuous process in the presence of isopropenyl acetate, and in the absence of a polymerization initiator, at a temperature of from about 250° C. to about 400° C., under autogenous pressure for a period of from about 0.25 minute to about 10 minutes.

References Cited in the file of this patent

UNITED STATES PATENTS 2,879,263   Anderson et al. ---------- Mar. 24, 1959